United States Patent Office 2,817,638
Patented Dec. 24, 1957

2,817,638
PROCESS OF PRODUCING POLYCONDENSATES

Rudolf Lotz, Klingenberg (Main), Germany, assignor to Vereinigte Glanzstoff-Fabriken A. G., Wuppertal-Elberfeld, Germany No Drawing. Application October 15, 1953,
Serial No. 386,400

Claims priority, application Germany October 24, 1952

3 Claims. (Cl. 260—2)

This invention relates to the production of novel polycondensates from partly aminated bis-halogen propionic acid amides. In the process according to this invention the formation of the polycondensates takes place in a solvent specifically suitable for the condensation, and the use of this solvent as a medium of reaction forms an important part of the invention.

It is well known to those skilled in the art that on causing acrylic acid nitrile, hydrochloric acid and an aldehyde such as formaldehyde, acetaldehyde or benzaldehyde to react with each other in the presence of water in a tube heated by means of the electric current, there result ω halogen compounds of the methylene, alkylidene or aralkylidene-bis-halogenpropionic acid halides, corresponding to the aldehyde used in the reaction in which the chlorine occupies the β position.

For instance, if methylene-bis-β-chloropropionic acid amide is acted upon in an autoclave during about 20 hours at ordinary temperature with liquid ammonia, there is formed a compound aminated at one end of the chain and constituted according to the formula $$Cl(CH_2)_2.CO.NH.CH_2.NH.CO(CH_2)_2.NH_2$$

One could call this compound also a substituted-bis-ωCl-ω'-aminopropionic acid amide.

Hitherto these compounds as well as the similarly aminated alkylidene- or aralkylidene-bis-halogenpropionic acid amides obtained by reaction with other aldehydes such as acetaldehyde or benzaldehyde have been heated to high temperatures in a vacuum until a light colored polycondensation product was formed.

I have now found that polycondensation can be carried out in a very simple manner if the reaction occurs in a solvent of a special kind.

Surprisingly these bis-halogen propionic acid amides aminated at one end of the chain which are insoluble in organic solvents, will dissolve in certain dioxy compounds constituted according to the general formula $$HO.(CH_2)_n.OH$$

wherein $n$ may be an integer from 8 to 12. I have found the decandiol-(1,10) to be quite particularly suitable for the purpose in view. Other suitable solvents are Octandiol-(1,8) _____ $HO.(CH_2)_8.OH$
Nonandiol-(1-9) _____ $HO.(CH_2)_9.OH$
Decandiol-(1-10) _____ $HO.(CH_2)_{10}.OH$
Undecandiol-(1-11) _____ $HO.(CH_2)_{11}.OH$
Dodecandiol-(1,12) _____ $HO.(CH_2)_{12}.OH$ The polycondensation will occur in vacuo as well as under normal pressure. However, in order to avoid as far as possible decoloration during the polycondensation, I prefer working in a vacuum.

The bis-halogenpropionic acid amides aminated at one end of the chain are heated in the solvent to such a temperature that a homogeneous solution is formed. If working in vacuo, the temperature may be allowed to rise to about 140° C. and, if working under normal pressure, to about 200° C. Complete polycondensation occurs within a few hours. The solvent still adhering to the polycondensation product can be removed by extraction, for instance with methanol.

The polycondensates are particularly useful in the production of plastics.

In the operation of my invention I may for instance proceed as follows:

Example 1

26 gr. decandiol-(1,10) are molten down. To the melt are added 5 gr. of the methylene-bis-chloropropionic acid amide aminated at one end of the chain constituted according to the formula $$Cl.(CH_2)_2.CO.NH.CH_2.NH.NH.CO.(CH_2)_2.NH_2$$

The solution is heated two hours in a vacuum of 10 mms. to 160° C.

The polycondensate was washed with methanol. Its melting point was 286° C.

Example 2

30 gr. decandiol-(1,10) were molten down and to the melt were added 3 gr. of the ethylidene-bis-chloropropionic acid amide aminated at one end of the chain constituted according to the formula $$Cl.(CH_2)_2.CO.NH.CH.NH.CO.(CH_2)_2.NH_2$$
$$\qquad\qquad\qquad\quad |$$
$$\qquad\qquad\qquad\;\, CH_3$$

melting at 185–186° C. The solution was heated 3 hours to 140° C. in a vacuum of 10 mm. After extraction with methanol a polycondensate was obtained, melting at 270° C.

Example 3

The reactants described with reference to Example 2 were heated 3 hours to 200° C. under atmospheric pressure. The polycondensate resulting in this operation was found to be identical with the one obtained in Example 2.

Example 4

23.5 gr. undecandiol-(1,11) were molten down and to the melt were added 5 gr. of a methylene-bis-chloropropionic acid amide aminated at one end of the chain constituted according to the formula $$Cl.(CH_2)_2.CO.NH.CH_2.NH.CO.(CH_2)_2.NH_2$$

The solution was heated 2 hours and a half to about 160° C. in a vacuum of 10 mm. The polycondensate was purified according to conventional methods.

Example 5

25 gr. dodecandiol-(1,12) were molten down and to the melt were added 5 gr. of the methylene-bis-chloropropionic acid amide aminated at one end of the chain. After heating the solution 3 hours to 150° C. in a vacuum of 10 mm. a polycondensate was obtained which was purified according to well-known methods and which was found to be well adapted for use in the manufacture of plastic masses.

Example 6

21 gr. octandiol-(1,8) were slowly molten down and to the melt were added 5 gr. of the methylene-bis-chloropropionic acid amide aminated at one end of the chain. The solution was heated 2 hours and a half to about 160° C. under a vacuum of 10 mm. The polycondensate obtained in this operation was freed from adhering solvent by extraction.

Various modifications may be made regarding the individual reactants, the temperatures, pressures and other conditions of reaction without departing from the invention and sacrificing the advantages thereof.

I claim:

1. The process of producing novel polycondensates adapted for use in the manufacture of plastic masses, which comprises dissolving a ω-halogenpropionic acid amide aminated at one end of the chain selected from the group consisting of the methylene-, and ethylidene-bis-β-halogenpropionic acid amides in a solvent constituted according to the general formula $$HO.(CH_2)_n.OH$$

wherein $n$ may be an integer from 8 to 12, and heating the solution to a temperature from about 140° C. to 200° C.

2. The process of claim 1, in which the solvent is decandiol-(1,10).

3. The process of claim 1, in which the solution is heated several hours to a temperature ranging from about 140° to about 160° C. under a vacuum of about 10 mm.

References Cited in the file of this patent

UNITED STATES PATENTS 2,537,689    Mowry et al. _____ Jan. 9, 1951